Patented Mar. 14, 1944

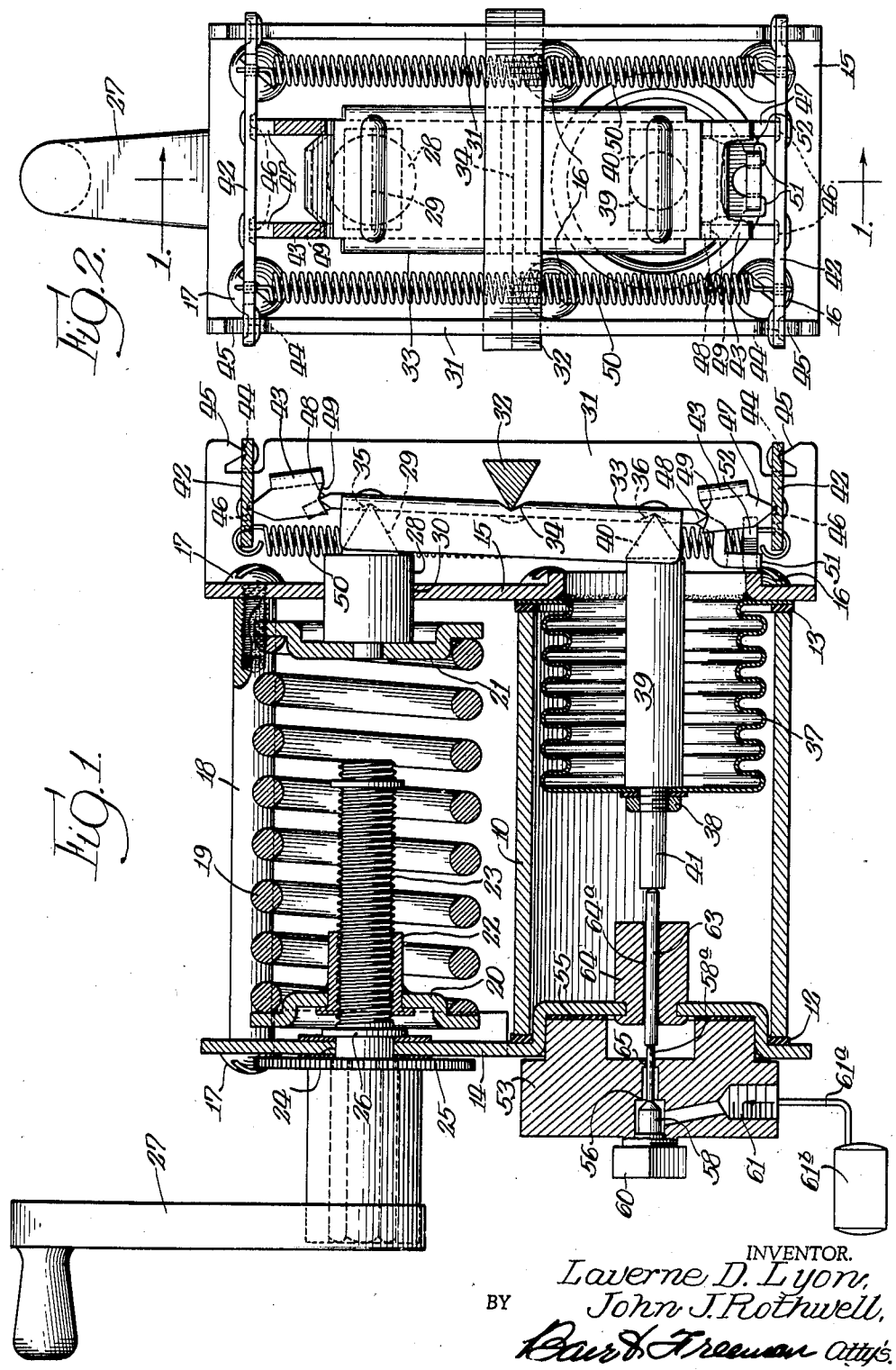

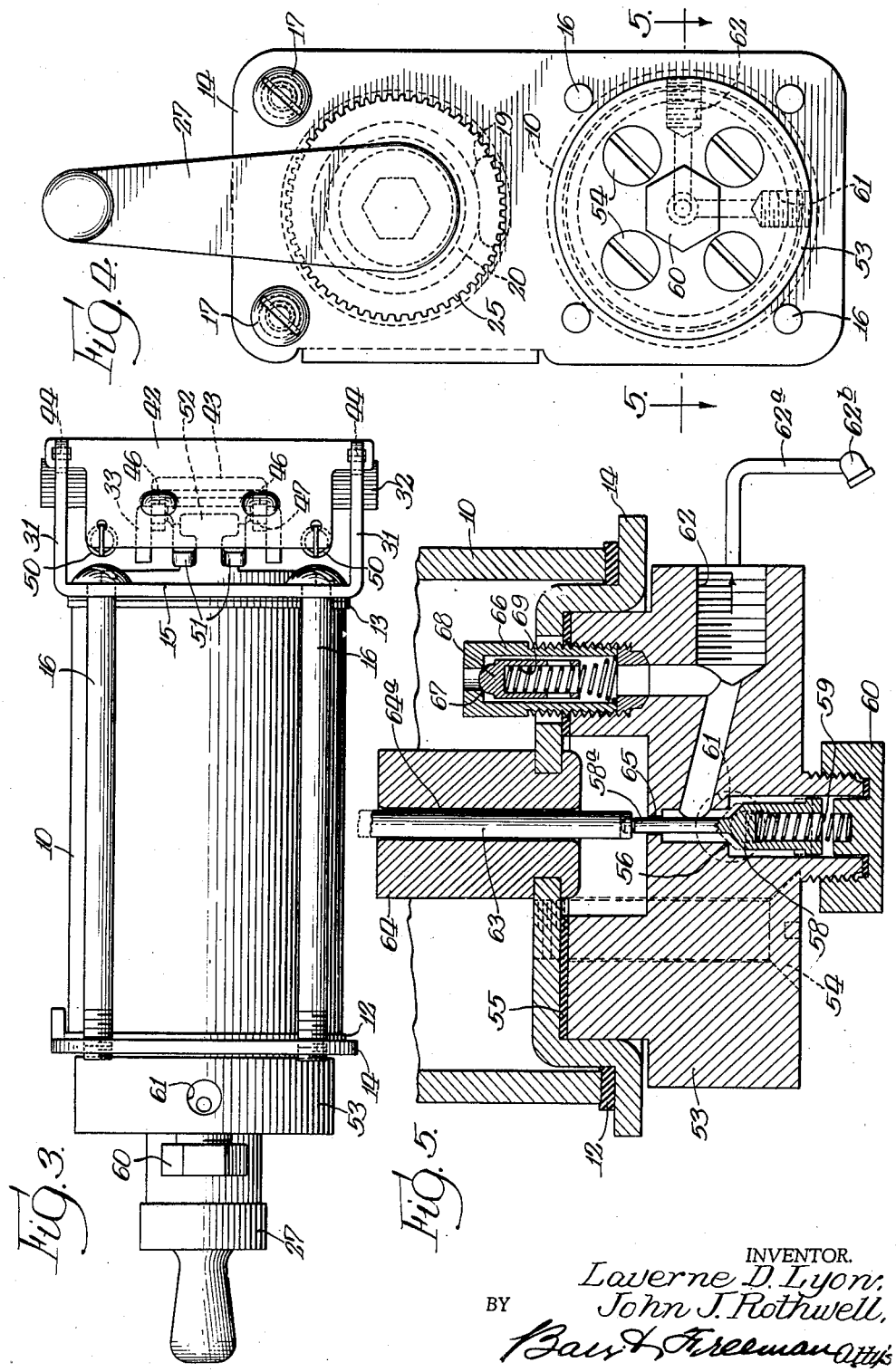

2,344,256

UNITED STATES PATENT OFFICE 2,344,256

TIRE INFLATER

La Verne Dean Lyon, Goshen, and John J. Rothwell, Elkhart, Ind., assignors to Penn Electric Switch Co., Goshen, Ind., a corporation of Iowa Application January 26, 1942, Serial No. 428,270

13 Claims. (Cl. 221—73.5)

Our invention relates to a tire inflater of the general type shown in Penn Reissue Patent No. 19,201, issued June 5, 1934.

One object of the present invention is to provide a tire inflater which has a smaller differential of operation than the type shown in the Penn patent whereby tires may be inflated up to a pressure closely approximating the tank pressure of the air supplied to the tire inflater.

Another object is to provide a tire inflater wherein the parts are so arranged and related to each other that a rugged structure is provided, and, at the same time, its size is considerably condensed so as to fit into a relatively small casing.

Still a further object is to provide a tire inflater utilizing a toggle spring and toggle lever arrangement as distinguished from a V-over-roller, snap-acting mechanism, as in the Penn patent, whereby the differential of operation is substantially reduced.

Another object is to provide a tire inflater utilizing a bellows for operating the pressure measuring apparatus, the bellows being arranged in a cylinder forming a charging chamber, the size of which is one of the determining factors for the operating characteristics of the tire inflater.

Still another object is to provide a tire inflater including a valve unit, which may be readily removed for replacement of the valves, thus facilitating the servicing of the inflater.

With these and other objects in view, our invention consists in the construction, arrangement and combination of the various parts of our device whereby the objects contemplated are attained, as hereinafter more fully set forth, pointed out in our claims and illustrated in the accompanying drawings. Although the invention is susceptible of a variety of embodiments, it is unnecessary to fully describe and illustrate more than one in order to give a full understanding of the invention both from its structural and functional standpoints. Accordingly, we have illustrated a preferred and desirable embodiment of the invention in the accompanying drawings, in which:

Figure 1 is a full-size vertical sectional view through a tire inflater embodying our invention;

Figure 2 is an end view of the inflater, the end shown being the right-hand end of Figure 1;

Figure 3 is a bottom plan view of Figure 1;

Figure 4 is an end view opposite that illustrated in Figure 2; and

Figure 5 is an enlarged sectional view on the line 5—5 of Figure 4 showing the details of a valve unit assembly on an enlarged scale.

On the accompanying drawings I have used the reference numeral 10 to indicate a cylinder. The cylinder 10 is interposed between gaskets 12 and 13 and end plates 14 and 15. Four tie bolts 16 retain the end plates with respect to the cylinder 10 and compress the gaskets 12 and 13 to prevent leakage from the interior of the cylinder.

The end plates 14 and 15 have extensions laterally from the cylinder 10, the extensions in Figure 1 being illustrated as upward from the cylinder. Two pairs of screws 17 and a pair of spacer rods 18 are provided for spacing the upward extensions of the plates 14 and 15 parallel to each other. A range spring 19 is located between the plates 14 and 15, its ends being confined between washers 20 and 21. The washer 20 has a threaded sleeve 22 in which an adjusting screw 23 is threaded. The adjusting screw 23 is rotatable and non-slidable in a perforation 24 of the end plate 14 and has a gear 25 on the outside of the end plate and a stop flange 26 on the inside thereof. A crank 27 is secured to the adjusting screw 23 for rotating the same, as desired. The gear 25 is adapted to be meshed with the gear of an indicating dial (not shown).

The range spring washer 21 has a stud 28 connected thereto and terminating in a prism-like pivot bar 29. The stud 28 extends slidably through a perforation 30 of the end plate 15. The end plate 15 is channel-shaped, the flanges thereof being indicated at 31. Through the flanges 31 a prism-shaped pivot bar 32 is mounted.

A channel-shaped operating lever 33 has a V-seat 34 at its center, adapted to pivot against the pivot bar 32. The operating lever 33 has two other V-seats 35 and 36. The seat 35 receives the pivot bar 29 of the range spring 19.

Within the cylinder 10 a bellows 37 is mounted. One end of the bellows is sealed relative to the end plate 15 and the other end is sealed by a nut 38 relative to a stem 39. The stem 39 has a prism-shaped pivot 40 coacting with the V-seat 36, and has a reduced portion 41 on which the nut 38 is threaded.

To provide toggle action for the operating lever 33 I provide a pair of toggle levers 42 and a pair of toggle links 43. The toggle levers 42 are in the form of plates, each having a pair of V-seats 44 adapted to coact with the V-points 45 formed on the flanges 31 of the end plate 15. The toggle levers 42 each have a second pair of V-seats 46 coacting with points 47 formed on the toggle links 43. The operating lever 33 has a pair of points 48 at each end, coacting with V-seats 49 of the toggle levers 43. The toggle levers are channel-shaped, and each has a pair of points 47 as well as a pair of seats 49. A pair of toggle springs 50 connects the toggle levers or plates 42 together to provide the necessary snap action in connection with the toggle arrangement. The operating lever 33 is limited in its movement by a bifurcated portion forming two fingers 51 at its lower end to straddle the leg of a T-shaped stop 52 extending from the end plate 15, as shown by dotted lines in Figure 3.

A valve unit is mounted on the end plate 14 and includes a body portion 53 secured thereto, as by screws 54. A gasket 55 is interposed between the valve body 53 and the end plate 14 to prevent leakage.

In the valve body 53 a seat 56 is provided for a valve 58. The valve 58 is normally seated by a spring 59 and access may be had to the valve by removing a closure nut 60.

The valve seat 56 is located between an inlet 61 from a supply tank 61b or other source of compressed air, and an outlet 62 which extends to a tire chuck 62b. An air line 61a connects the tank 61b to the inlet 61, and an air line or hose 62a connects the outlet 62 with the tire chuck 62b. The parts 61a, 61b, 62a and 62b are shown diagrammatically. The valve 58 is adapted to be operated by the stem 39 through its reduced portion 41 and the thrust pin 63. The thrust pin 63 extends slidably through a bore 64a of the sleeve 64, there being approximately .004 inch clearance. Such clearance provides a restricted passageway for air-flow, as will hereinafter appear. Similarly, a stem 58a of the valve 58 extends through a bore 65 of the valve body 53 which has a comparable degree of clearance to provide for restricted or minimum air-flow.

A check valve body 66 is screwed into the valve body 53 and is provided with a seat 67. A check valve 68 is normally seated against the seat 67 by a spring 69.

*Practical operation*

In the operation of our tire inflater, assuming that it is desired to put a predetermined pressure, as thirty pounds, of air into a tire, the operator turns the crank 27 until the indicating dial (not shown), meshed with the gear 25, registers thirty pounds in substantially the same manner as disclosed in the Penn patent. The normally closed tire chuck 62b, connected with the outlet 62, is then applied to the tire, and if the pressure therein is less than thirty pounds a filling operation will occur. The parts are normally in a position opposite that shown in Figure 1, with the valve 58 closed due to pressure in the cylinder 10 acting on the bellows 37 to overcome the tension of the range spring 19. The air pressure in the cylinder 10 is trapped in the air hose 62a connected with the outlet 62 by the closed tire chuck 62b thereon.

When the tire chuck is applied to the valve of the tire, the chuck is opened in a well-known manner, thus causing a pressure drop in the outlet 62, and likewise in the cylinder 10, such drop being readily permitted in the cylinder due to the check valve 68 opening against the tension of the light spring 69. The pressure drop in the cylinder 10 permits the range spring 19 to rock the operating lever 33 clockwise so that it snaps over dead center to the position of Figure 1, thus opening the valve 58 so that tank air may pass through the valve. The air closes the check valve 68 and passes through the outlet 62 to the tire, as well as through the bores 65 and 64a. The passage of the air through the bores 65 and 64a is relatively slow, so that it takes some little time for the air pressure to build up in the cylinder 10. The size of the cylinder also determines the length of this pressure build-up period.

When the pressure in the cylinder 10 has built up to a point that it causes the bellows 37 to overcome the tension of the range spring 19, the operating lever 33 will snap to the position opposite Figure 1, thus closing the valve 58 after a predetermined "shot" of air has passed to the tire. The air pressure in the cylinder 10 now quickly equalizes with that in the tire by opening the check valve 68 and passing through it, and if the equalized pressure is insufficient to keep the range spring 19 from moving the operating lever 33 again to the position of Figure 1, there will be another shot of air, and such shots will continue until the tire has been filled to the setting of the adjusting screw 23. When such pressure has been reached in the tire, then the pressure will be high enough in the cylinder 10 to prevent the range spring 19 from snapping the operating lever 33 over center, and the cessation of operating cycles will indicate to the operator that the tire has been filled to the desired pressure.

When the tire inflater is not in use, the pressure built up in the air hose against the tire chuck and in the cylinder 10 keeps the bellows 37 under pressure to overcome the tension of the spring 19 so that operation of the tire inflater will not occur until another tire of insufficient pressure is filled, unless, of course, there are leaks in the air hose or chuck.

We have found that our arrangement of parts with the check valve 68 and the valve 58 mounted closely adjacent each other in the valve body 53, as well as the use of a toggle spring arrangement, makes it possible for our tire inflater to be operated at output pressure closely approximating input pressure. The two pressures are much closer than possible with the type of arrangement shown in the Penn patent. Accordingly, our tire inflater may be used in connection with truck tires requiring as high as one hundred pounds per square inch where the tank pressure usually carried does not exceed one hundred and twenty-five pounds. At the same time, our device has been designed so that it is compact and may accordingly fit into a relatively small rectangular casing without, however, sacrificing accessibility to the valves 58 and 68 in the valve body 53. The valve body being readily removable, permits access to both valves for reseating, or renewal, as required. The arrangement is such that it eliminates copper tube connections and long passageways of the Penn patent, thus contributing to operation of the tire inflater at an output pressure much closer to the input pressure.

Some changes may be made in the construction and arrangement of the parts of our device without departing from the real spirit and purpose of our invention, and it is our intention to cover by our claims any modified forms of structure, or use of mechanical equivalents, which may be reasonably included within their scope.

We claim as our invention:

1. In a tire inflater, an air service line, means for discharging air in successive charges through said line comprising a valve therein, a lever, pressure actuated operating means therefor including a chamber having an opening and an operating pin in said chamber, said valve having a stem extending through said opening into said chamber and operated by said operating pin, the clearance between said stem and opening constituting a restricted passage for subjecting said last means to pressure in the air line on the outlet side of said valve, said lever being operatively connected with said valve through said operating stem and said valve stem, toggle lever and spring means for imparting snap action movement to said lever and thereby snap action to said valve, means acting on said lever in resistance to the air pressure thereon, and a check valve connection between said chamber and said outlet, said check valve connection opening toward said outlet.

2. In a device of the class described, an air service line having a tire chuck, means for discharging air in successive charges through said line when said chuck is open comprising a valve in said air service line, a lever, a pressure chamber including a movable part for operating said lever, a restricted passage for subjecting said chamber to pressure in the air line between said chuck and said valve, said lever being operatively connected with said valve, toggle lever and spring means for imparting snap acting movement to said valve, means acting on said lever in resistance to the air pressure thereon, and a check valve connection between said pressure chamber and said outlet, said check valve connection being independent of said restricted passage and opening toward said outlet.

3. In an air service device, a line for conducting compressed air, a tire chuck at the discharge end thereof, a valve in said line, and means for successively opening and closing said valve for supplying air therethrough in successive charges when said tire chuck is opened, said means including a bellows chamber, a bellows closing one end thereof, said valve closing the other end thereof, restricted passage means connecting said chamber with the line between said tire chuck and said valve, a check valve independent of said restricted passage means and affording easy and rapid exhaust from said bellows chamber to said tire chuck, and means interposed between said bellows and said valve for opening the valve in response to predetermined pressure drop in said bellows chamber.

4. In a device of the class described, an air service line having a discharge portion provided with a tire chuck, and means for discharging air in successive charges when said tire chuck is opened, comprising a valve in the air service line, a lever, means for subjecting the lever to pressure in the air line between said tire chuck and said valve, the service line having a restricted passage associated with said valve and leading to a pressure actuated member adapted to actuate said lever, a check valve to permit air to pass freely therefrom, a quick action device for said lever imparting movement to said first valve, and means for acting on said lever in resistance to the air pressure thereon.

5. In a tire inflating apparatus, an air service line adapted to discharge air into a tire, an inlet valve for said service line adapted, when open, to admit air more rapidly than it normally passes into a tire, a guide opening for said inlet valve, means providing a chamber, said guide opening constituting a restricted passage connecting said line and said chamber, a check valve adapted to permit air to pass freely therethrough from said chamber to said service line, and means controlling said inlet valve in accordance with pressure in said chamber.

6. In tire inflating apparatus, an air service line adapted to discharge air into a tire, an inlet valve for said line adapted, when open, to admit air more rapidly than it normally passes into a tire, means providing an elongated chamber, a valve body at one end of said chamber, said inlet valve being mounted therein and having a stem, said chamber having an opening for said stem and constituting a restricted passage into the chamber from said inlet valve, a check valve adapted to permit air to pass freely from said chamber to said line, and means for opening said inlet valve when the pressure in said chamber falls to a predetermined pressure and closing said inlet valve when the pressure in said chamber rises above said predetermined pressure.

7. In a tire inflater, a cylinder, a pair of end plates thereon, an operating lever pivoted on one of said end plates, toggle levers at the ends of said operating lever and pivoted to said one end plate, toggle link connections between the ends of said operating lever and said toggle levers, a bellows for said cylinder, a valve unit, said valve unit comprising a body having an inlet for air from a supply tank and an outlet to a tire or the like, a valve between said inlet and outlet, a stem connected with said lever for operating said valve, a check valve providing for free air flow from the interior of said cylinder to said outlet and preventing reverse air flow from said outlet to the interior of said cylinder, and a restricted opening from said outlet to the interior of said cylinder providing for minimum air flow from said outlet to said cylinder.

8. In a tire inflater, a cylinder, a pair of end plates thereon, an operating lever pivoted on one of said end plates, toggle levers at the ends of said operating lever and pivoted to said one end plate, toggle link connections between the ends of said operating lever and said toggle levers, toggle springs extending from one of said toggle levers to the other one, a bellows for said cylinder, a valve unit comprising a body having an inlet for air from a supply tank and an outlet to a tire or the like, a valve between said inlet and outlet, a stem for operating said valve, said stem being sealingly connected to said operating lever, said valve unit having a check valve therein providing for free air flow from the interior of said cylinder to said outlet and preventing reverse air flow from said outlet to the interior of said cylinder, and a restricted opening from said outlet to the interior of said cylinder providing for minimum air flow from said outlet to said cylinder.

9. In a tire inflater, a cylinder, a pair of end plates thereon having extensions laterally from said cylinder, a range spring and an adjusting screw therefor mounted in said extensions, an operating lever pivoted on one of said end plates, said one end plate being channel-shaped and having a pivot for said operating lever extending between the flanges of the end plate, toggle levers at the ends of said operating lever and pivoted to said one end plate, toggle link connections between the ends of said operating lever and said toggle levers, a bellows for said cylinder, a removable valve unit, said valve unit comprising a body having an inlet for air from a supply tank and an outlet to a tire or the like, a valve between said inlet and outlet, a stem connected with said lever for operating said valve, a check valve providing for free air flow from the interior of said cylinder to said outlet and preventing reverse air flow from said outlet to the interior of said cylinder, and a restricted opening from said outlet to the interior of said cylinder providing for minimum air flow from said outlet to said cylinder.

10. In a tire inflater, a cylinder, a pair of end plates thereon having extensions laterally from said cylinder, a range spring and an adjusting screw therefor mounted in said extensions, an operating lever pivoted on one of said end plates, said one end plate being channel-shaped and having a pivot for said operating lever extending between the flanges of the end plate, toggle levers at the ends of said operating lever and pivoted to said one end plate, toggle link connections between the ends of said operating lever and said toggle levers, toggle springs extending from one of said toggle levers to the other one, a bellows closing one end of said cylinder, a removable valve unit closing the other end of said cylinder, said valve unit comprising a body having an inlet for air from a supply tank and an outlet to a tire or the like, a valve between said inlet and outlet, a stem for operating said valve, said stem being sealingly connected to said operating lever, said valve unit having a check valve therein providing for free air flow from the interior of said cylinder to said outlet and preventing reverse air flow from said outlet to the interior of said cylinder, and a restricted opening from said outlet to the interior of said cylinder providing for minimum air flow from said outlet to said cylinder.

11. In a tire inflater, a cylinder, a pair of end plates thereon having extensions laterally from said cylinder, tie rods for connecting said end plates to said cylinder, a range spring between said end plates, an adjusting screw rotatable in one of said end plates and threadedly coacting with one end of said range spring, the other of said end plates being channel-shaped and having an opening, an operating element connected with said range spring and extending through said opening, an operating lever pivoted between the flanges of said other end plate, said operating element contacting therewith under the pressure of said range spring, toggle levers at the ends of said operating lever and pivoted to the flanges of said other end plate, toggle links interposed between said toggle levers and the ends of said operating lever, springs connecting said toggle levers together to effect toggle action of the toggle levers and toggle links on said operating lever, a bellows closing one end of said cylinder, a removable valve unit closing the other end thereof, said valve unit comprising a body having an inlet from an air supply tank and an outlet to a tire or the like, a valve between said inlet and outlet, a stem for operating said valve, said stem being connected with said bellows and engaging said operating lever to operate the same depending upon air pressure in said cylinder in opposition to said range spring, said valve unit having a check valve therein opening from the interior of said cylinder toward said outlet, and a restricted opening for providing minimum air flow from said outlet to the interior of said cylinder.

12. In a tire inflater, a cylinder, a pair of end plates thereon having extensions laterally from said cylinder, a range spring between said end plates, an adjusting screw rotatable in one of said end plates and threadedly coacting with one end of said range spring, the other of said end plates having an opening therethrough, an operating element connected with said range spring and extending through said opening, an operating lever pivoted to said other end plate, said operating element contacting therewith under the pressure of said range spring, toggle mechanism for said operating lever, a bellows closing one end of said cylinder, a valve unit closing the other end thereof, said valve unit comprising a body having an inlet from an air supply tank and an outlet to a tire or the like, a valve between said inlet and outlet, a stem for operating said valve, said stem being connected with said bellows and engaging said operating lever to operate the same depending upon air pressure in said cylinder in opposition to said range spring, a check valve opening from the interior of said cylinder toward said outlet, and a restricted opening for providing minimum air flow from said outlet to the interior of said cylinder.

13. In a tire inflater, a cylinder, a range spring, an adjusting screw for said range spring, an operating element connected with said range spring, an operating lever, said operating element contacting therewith under the pressure of said range spring, means to effect toggle action on said operating lever, a bellows closing one end of said cylinder, a removable valve unit closing the other end thereof, said valve unit comprising a body having an inlet from an air supply tank and an outlet to a tire or the like, a valve between said inlet and outlet, a stem for operating said valve, said stem being connected with said bellows and engaging said operating lever to operate the same depending upon air pressure in said cylinder in opposition to said range spring, said valve unit having a check valve therein opening from the interior of said cylinder toward said outlet and a restricted opening for providing minimum air flow from said outlet to the interior of said cylinder.

LA VERNE DEAN LYON.
JOHN J. ROTHWELL.